United States Patent
Nassor et al.

(10) Patent No.: US 7,966,491 B2
(45) Date of Patent: Jun. 21, 2011

(54) PROTECTION OF THE DISTRIBUTION OF DIGITAL DOCUMENTS IN A PEER TO PEER NETWORK

(75) Inventors: Eric Nassor, Thorigne Fouillard (FR); Frédéric Maze, Langan (FR); Pascal Viger, Coesmes (FR)

(73) Assignee: Canon Kabushiki Kaisha, Tokyo (JP)

( * ) Notice: Subject to any disclaimer, the term of this patent is extended or adjusted under 35 U.S.C. 154(b) by 651 days.

(21) Appl. No.: 10/857,884

(22) Filed: Jun. 2, 2004

(65) Prior Publication Data

US 2005/0044146 A1 Feb. 24, 2005

(30) Foreign Application Priority Data

Jun. 2, 2003 (FR) ..................................... 03 06616

(51) Int. Cl.
 *H04L 9/32* (2006.01)
(52) U.S. Cl. ................ 713/168; 726/4; 726/17; 726/21; 726/27; 713/153; 380/59; 380/255; 709/225; 709/229
(58) Field of Classification Search .................. 713/168
 See application file for complete search history.

(56) References Cited

U.S. PATENT DOCUMENTS

| | | | |
|---|---|---|---|
| 6,263,432 B1 | 7/2001 | Sasmazel et al. ............. 713/100 |
| 6,301,617 B1 | 10/2001 | Carr ............................. 709/227 |
| 6,336,186 B1 * | 1/2002 | Dyksterhouse et al. ...... 713/156 |
| 6,865,599 B2 * | 3/2005 | Zhang .......................... 709/218 |
| 6,928,545 B1 * | 8/2005 | Litai et al. ..................... 713/185 |
| 7,047,406 B2 * | 5/2006 | Schleicher et al. ........... 713/168 |
| 7,065,579 B2 * | 6/2006 | Traversat et al. ............. 709/230 |
| 7,120,691 B2 * | 10/2006 | Goodman et al. ............ 709/225 |
| 7,130,921 B2 * | 10/2006 | Goodman et al. ............ 709/244 |
| 7,272,645 B2 * | 9/2007 | Chang et al. .................. 709/223 |
| 7,287,157 B2 * | 10/2007 | Washio ......................... 713/155 |
| 2002/0178261 A1 * | 11/2002 | Chang et al. .................. 709/225 |
| 2003/0056093 A1 * | 3/2003 | Huitema et al. .............. 713/156 |
| 2003/0101235 A1 * | 5/2003 | Zhang .......................... 709/218 |
| 2003/0105812 A1 * | 6/2003 | Flowers et al. ............... 709/203 |
| 2003/0145094 A1 * | 7/2003 | Staamann et al. ............ 709/229 |
| 2003/0163697 A1 * | 8/2003 | Pabla et al. ................... 713/171 |
| 2003/0177186 A1 * | 9/2003 | Goodman et al. ............ 709/205 |
| 2003/0177246 A1 * | 9/2003 | Goodman et al. ............ 709/228 |

(Continued)

OTHER PUBLICATIONS

M. Findeli, "P2P (Peer-to-Peer Networking)," Jul. 1, 2001, (Provided by applicant).*

(Continued)

*Primary Examiner* — Nasser Moazzami
*Assistant Examiner* — Oscar A Louie
(74) *Attorney, Agent, or Firm* — Fitzpatrick, Cella, Harper & Scinto

(57) ABSTRACT

A central server in a network of a hybrid peer to peer type, receives a request from a client for obtaining a digital document, where the request contains a reference of the digital document. The server selects a peer system of the network likely to contain the digital document, and generates an access key for controlling access to the digital document by the client, where the access key is generated by an encrypting method using a private key of the central server, a current time when the encrypting method is executed and an address of the client on the network. The server then sends a message to the client, where the message has the reference of the digital document, an address of the selected peer system on the network and the generated access key.

27 Claims, 5 Drawing Sheets

U.S. PATENT DOCUMENTS

| | | | | |
|---|---|---|---|---|
| 2003/0200432 A1* | 10/2003 | Washio | | 713/168 |
| 2004/0088348 A1* | 5/2004 | Yeager et al. | | 709/202 |
| 2004/0088369 A1* | 5/2004 | Yeager et al. | | 709/217 |
| 2004/0122958 A1* | 6/2004 | Wardrop | | 709/229 |
| 2004/0148434 A1* | 7/2004 | Matsubara et al. | | 709/246 |

OTHER PUBLICATIONS

"Peer-to-Peer (P2P) Networking," Findeli, Jul. 1, 2001.*

F. Bordignon, et al., "Gnutella: Distributed System for Information Storage and Searching Model Description", Universidad Nacional de Lujan.

U.S. Chathapuram, "Security in Peer-to-Peer Networks", Internet citation, Aug. 8, 2001, <URL:http://server.cerc.wvu.edu/classes/cs491h_summer2_2001/sankaran_securitoverv>.

M. Findeli, "P2P (Peer-to-Peer Networking)", Internet citation, Jul. 1, 2001, <URL:http://findeli.com/docs/p2p.pdf>.

K. Wooyoung, et al., "A Secure Platform for Peer-to-Peer Computing in the Internet", Proceedings of the 35th Hawaii International Conference on System Sciences, Jan. 7, 2002, pp. 3948-3957.

K. Wooyoung, "Advanced Reality Introduces Peer-to-Peer Collaboration Platform that Makes Any Application Collaborative", Internet citation, Aug. 14, 2003, <URL:http://www.advancedreality.com/news_and_events/Press_Releases/2001/Presence-AR%2>.

U.S. Appl. No. 10/781,772, filed Feb. 20, 2004.

* cited by examiner

PROTECTION OF THE DISTRIBUTION OF DIGITAL DOCUMENTS IN A PEER TO PEER NETWORK

The present invention relates to a method of distributing digital documents in a telecommunications network and to a method of protecting this distribution.

The invention also relates to a peer system and to a central server respectively adapted to implement the distribution method and the protection method according to the invention.

More, precisely the invention is placed in the context of a distribution network of the hybrid peer to peer type.

It should be stated for this purpose that there exist three categories of peer to peer systems:
- centralized peer to peer systems, such as the system described in the document WO 01/84799 (NAPSTER). In such systems, there exist two types of server, namely peer servers and a central server. Peer servers store and directly exchange documents with each other but the central server is involved in each exchange, in particular to indicate the location of these documents;
- totally distributed peer to peer systems, that is to say functioning without a central server, such as the Gnutella system described in the document "Gnutella: Distributed System and Information Storage and Searching—Model Description (Bordignon and Tolosa, Universidad Nacional de Luján)"; and
- hybrid peer to peer systems in which a central server is present but intervenes only for a few functionalities, for example the connection of the peer systems to the distribution network.

The document U.S. Pat. No. 6,301,617 "Selection of Resources Utilizing Virtual Uniform Resource Locator (Wayne J. Carr, Intel Corporation, 1999)", describes a resource distribution system comprising a central server which, on reception of a request coming from a client, seeks the best location of these resources on the network. If the server does not possess the sought-for resources, it sends a message for redirecting the client to another server likely to have these resources.

The distribution system described in this document has a prime limitation, according to which only the central server is adapted to supply the aforementioned redirection messages. Consequently this system is not adapted to a hybrid peer to peer network.

Above all, the server described in this document does not make it possible to carry out the distribution of resources, nor to manage the redirection messages, according to the access rights of the client.

The invention aims to resolve the problems mentioned above, namely to provide a distribution system in a hybrid peer to peer network allowing the management of rights of access to the digital documents shared on this network.

According to a first aspect, the invention relates to a system in a network of the hybrid peer to peer type comprising means for receiving a request from a client for obtaining a digital document for that client;

means for obtaining an address of at least one second system likely to contain said document;

means for comparing at least one attribute of said system with at least one corresponding attribute of said at least one second system; and means for sending said address of said at least one second system to said client according to a result supplied by said comparison means.

Thus the access control means of the peer system according to the invention make it possible to manage access to a document by a client, using an access key.

This peer system also comprises means of distributing at least part of the document if the latter is stored in a memory accessible to the peer system and if its access is authorized.

When the document cannot be distributed to the client by the peer system according to the invention, the latter sends to the client the address of at least one second peer system likely to contain this document.

According to a second aspect, the invention relates to a central server in a network of the hybrid peer to peer type comprising:

means for receiving a request from a client for obtaining a digital document by that client, said request containing a reference of said document;

means for selecting a peer system of the network likely to contain said document;

means for generating an access key for controlling access to the document by said client, said means for generating the access key being adapted to generate said access key by an encrypting method using a private key of said central server, the time and the address of said client on the network; and means for sending a message to the client, comprising the reference, the address of the peer system on the network and the access key.

Thus the access key is generated by the central server of the hybrid network.

The central server according to the invention is thus used principally for purposes of protection and for sending to the client a first message containing the address of a peer system of the network likely to contain the document requested by the client.

Preferably, the central server also comprises means of authenticating an identifier of a user of the client.

These authentication means are, for example, adapted to verify the validity of a password transmitted by the user of the client.

This characteristic advantageously makes it possible to associate access rights with a user of the distribution system according to the invention.

Correspondingly, in this preferred embodiment, the control means of the peer system according to the invention comprise decrypting means using a public key of the central server, these decrypting means being adapted to obtain, from the access key, the aforementioned time and address.

Moreover, still in this same preferred embodiment, the means for receiving a request from the peer system are adapted to obtain the address of the client directly from the request. The peer system then compares the address obtained from the access key and the address obtained directly by the request reception means.

When these addresses are different, the control means of the peer system refuse access to the document.

These control means also refuse access to the document when the time elapsed since the time obtained by the decrypting means is greater than a predetermined time.

Thus the peer system and the central server cooperate in order to make the distribution system according to the invention secure according to two aspects, namely the authentication of the client and the request processing time.

In a preferred variant embodiment, the encrypting method of the central server uses the identifier of the user of the client.

This identifier is obtained by the decrypting means of the peer system using the access key.

In this variant embodiment, the peer system also comprises authentication means adapted to verify the right of access to the document by the user from the identifier.

Thus this variant embodiment reinforces the security of the distribution system according to a third aspect, namely the authentication of the client system originating the request for obtaining a document.

Preferably, when the network is of the Internet type, the request reception means and the message sending means of the server use the HTTP protocol.

More precisely, the reference of the document is included in a URL, and the message sending means are adapted to send the message to the client in the form of an HTTP response of the forward type.

This characteristic is particularly advantageous since the client can thus access the documents of the distribution system according to the invention in a secure manner, by means of a standard Internet browser.

According to another embodiment, the message sending means are adapted to send the message in the form of a page containing:
  a first window managed by the central server, this first window comprising a link whose activation generates the sending of a request to the central server in order to obtain the address of a second peer system likely to contain said digital document; and
  at least one second window intended to be managed by the peer system or the second peer system.

Thus, if the user of the client activates this link, the content of the second window is modified.

The first window can comprise in particular a link to the requested document but also to other documents accessible to the user. It can also comprise advertising information and links to data relating to the management of the user by the central server.

In a preferred embodiment of the peer system according to the invention, the means for obtaining the address of at least one second peer system are adapted to send an invitation message comprising the reference of the document to the second peer system and to receive a confirmation message from a second peer system, possibly different from the destination of the invitation message, when the document is available in a memory accessible to said destination.

Preferably, the confirmation message signifies the fact that the user is authorized to access the document from this second peer system.

Thus the distribution system according to the invention makes it possible to associate rights of access to a document, these access rights being able to be different for each peer system of the distribution system.

In particular, when a peer system is not authorized to deliver a document to a client, it transmits an invitation message to another peer system which may possibly authorize access to this document.

In a preferred variant embodiment, the invitation message comprises the identifier of the user.

Thus the confirmation message will be received only provided that this user is authorized to access the document from the second peer system originating the confirmation message.

In a preferred embodiment, the attributes of the peer system and of the second peer system used by the comparison means represent the load or communication capacities of the systems, the number of digital documents stored, the number of documents or document parts distributed by these systems, or the number of documents available for a given user.

Thus the peer server according to the invention can choose to distribute the document if its load is less than that of the second peer system, if its communication capacities are greater than those of the second peer system, or if it is less often solicited for the distribution of documents.

The invention also relates to a document distribution method able to be used in a system of a network of the hybrid peer to peer type, this distribution method comprising
  a step of receiving a request, from a client, for obtaining said document for said client;
  a step of obtaining the address of at least one second system likely to contain said document;
  a step of comparing at least one attribute of said system with at least one corresponding attribute of said at least one second system; and
  a step of sending said address of said at least one second system to said client according to a result of said comparison step.

The invention also relates to a method of protecting the distribution of a digital document, this protection method being able to be implemented in a central server of a network of the hybrid peer to peer type and comprising:
  a step of receiving a request from a client for obtaining a document by that client, said request comprising a reference of said document;
  a step of selecting a peer system of said network likely to contain said document;
  a step of generating an access key for controlling access to the document by the client, said step of generating the access key, comprising a generation of said key by an encrypting method using a private key of said central server, the time and the address of said client on the network;
  a step of sending a message to said client, comprising said reference, the address of said peer system on said network and said access key.

The invention also relates to:
  a distribution system comprising at least one server and at least one system as briefly described above;
  an information medium which can be read by a computer system, possibly totally or partially removable, in particular a CD-ROM or magnetic medium such as a hard disk or a diskette, characterized in that it contains instructions of a computer program for implementing a protection method and/or a distribution method as briefly described above, when this program is loaded in and executed by a computer system; and
  a computer program stored on an information medium, the program containing instructions for implementing a protection method and/or a distribution method as briefly described above, when this program is loaded in and executed by a computer system.

As the particular advantages of the protection method, the distribution method of the distribution system, the information carrier and the computer program are identical to those of the server and of the system described previously, they will not be repeated here.

Other aspects and advantages of the present invention will emerge more clearly from a reading of the description of particular embodiments which follow, this description being given solely by way of non-limiting example and made with reference to the accompanying drawings, in which.

The invention can be applied to the distribution and to the protection of the distribution of any type of digital document, namely in particular digital videos, digital audio documents and text files.

In the description which follows, the example will be used of the distribution and the protection of the distribution of digital images organized in collections of digital images.

Figure 1:
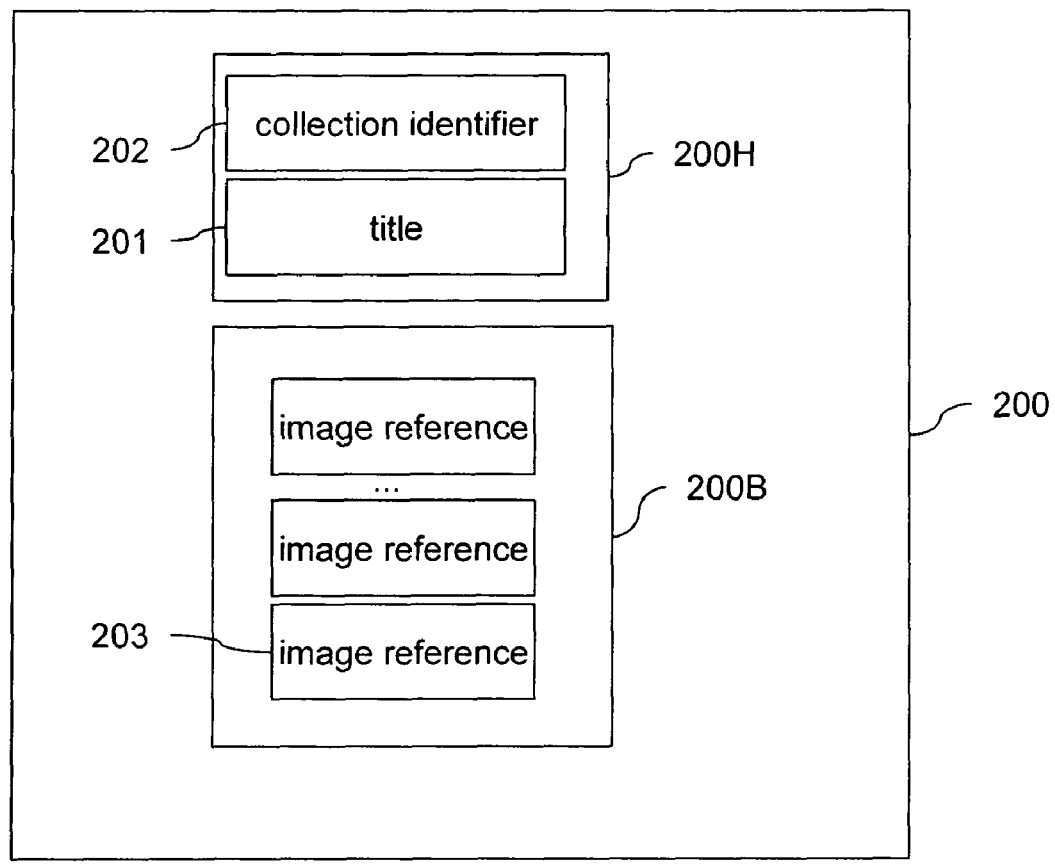
FIG. 1 depicts a collection of digital images.

FIG. 1 depicts schematically a collection 200 of digital images, each digital image having a unique reference 203.

For reasons of simplification, the digital image 203 will be merged with its unique reference 203.

The creation of a collection of digital images is known to persons skilled in the art and will not be described here. It consists of associating these images with an image container (otherwise referred to as a "collection"), for example by means of a suitable graphical interface of a peer system.

In the preferred embodiment described here, the reference 203 of the image 203 is contained in a collection of images identified by the unique identifier 202.

In the preferred embodiment described here, a collection 200 comprises:
  firstly a header 200H, comprising a title 201 and an identifier 202 of the collection; and
  secondly a body 200B, comprising a list of references 203 of the digital images in this collection.

A collection 200 can possibly itself comprise one or more other collections, that is to say the collection 200 may contain in its part 200B at least the identifier 202 of another collection.

Figure 2:
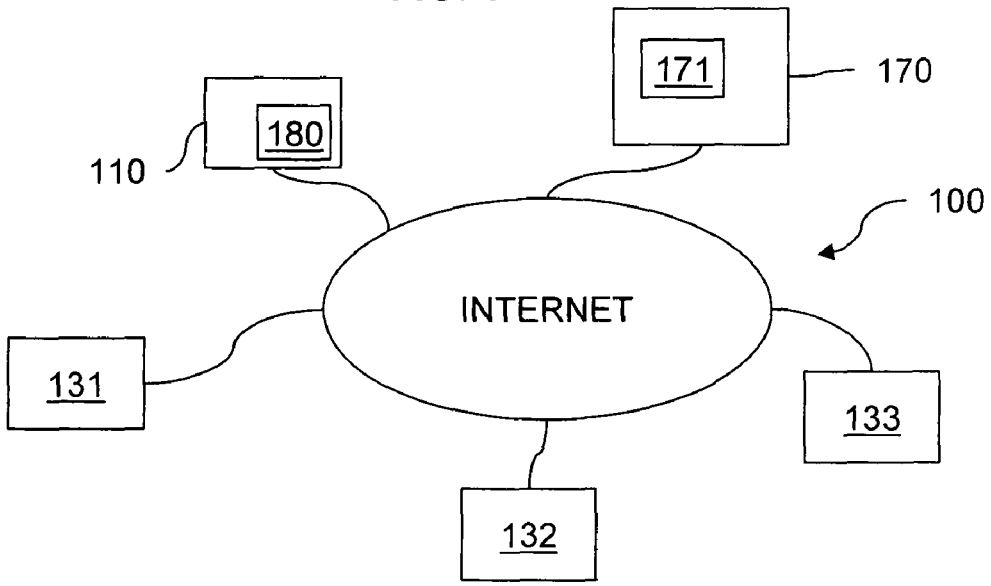
FIG. 2 depicts a system for distributing images according to the present invention.

FIG. 2 depicts a digital image distribution system 100 according to the present invention.

The image distribution system 100 comprises a central server 110 and various peer systems 131, 132 and 133 connected to a telecommunications network according to a topology of the hybrid peer to peer type.

Preferably, the telecommunications network is of the "Internet" type.

The invention can in particular be used in a public network, a private local network or a mobile telecommunications network.

The central server 110 and the peer systems 131, 132, 133 can be connected to the telecommunications network by hardware means (modem, network card etc) and suitable dedicated software, these connection means implementing, for example, a telecommunications standard such as the Ethernet, ADSL or UMTS standard.

In the system described here, the peer systems 131, 132, 133 communicate with the central server 110 according to a protocol of the conventional "client-server" type known to persons skilled in the art.

Communications can also be established directly between the peer systems.

In the embodiment of the distribution system described here, the server 110 comprises a database 180 containing:
  the state of the peer to peer network, namely a list of the addresses of the peer systems of the distribution system active at a given moment;
  the capabilities of these peer systems in terms of processor and memory size;
  the communication capacities of these peer systems (network connection type, modem speed etc);
  the list of references 203 of the digital documents and/or of the collections 202 which the peer systems wish to share on the network.

In practice, when a peer system 131, 132, 133 joins itself to the distribution network according to the invention, the latter registers itself with the server 110 and supplies to it its power capability, its communication capacities, and the references of documents 203 and collections 202 which it wishes to share.

The central server 110 regularly updates the network by interrogating the various peer systems, for example using the PING request known to persons skilled in the art.

The distribution system 100 described here also comprises a client system 170.

This client 170 is not adapted to implement the distribution method according to the invention, but it has a standard Internet browser 171 known to persons skilled in the art, for example Microsoft Internet Explorer 6 or Netscape 7.

It will be assumed hereinafter that a user U of this client 170 is seeking to access a digital image 203 in the distribution network 100.

It will also be assumed that the peer systems 131 and 132 each contain the digital image 203 and that the access rights of the user U authorize it solely to access the digital image 203 in the peer system 132.

Figure 3:
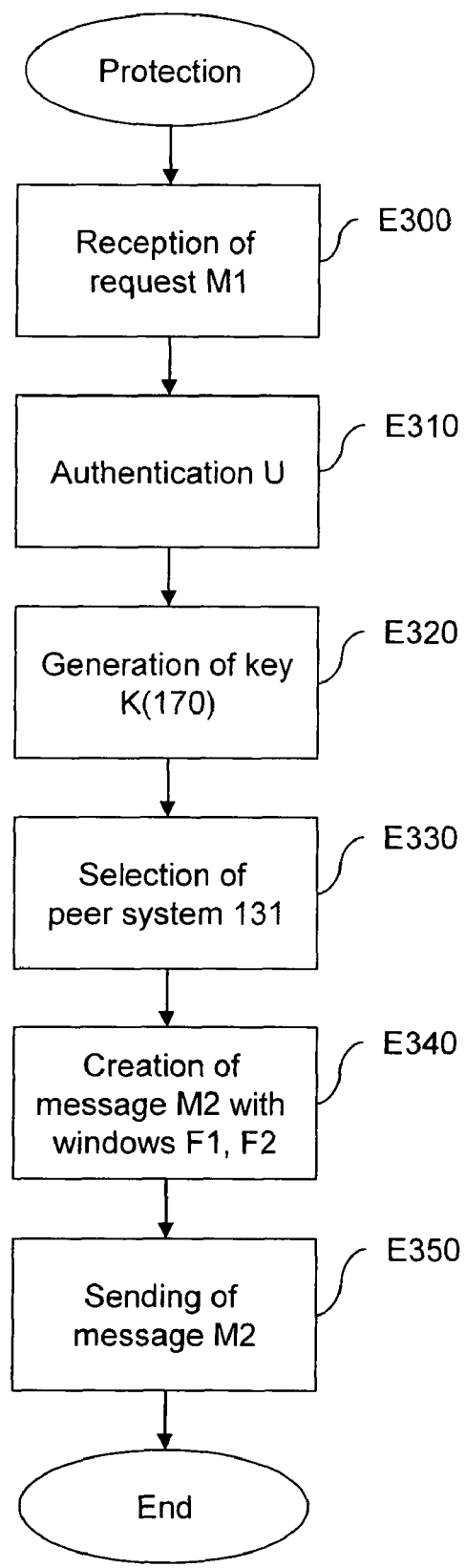
FIG. 3 depicts the main steps of a protection method according to the invention in a preferred embodiment.

FIG. 3 depicts the main steps E300 to E350 of a protection method according to the invention in a preferred embodiment.

This protection method can be set up in the central server 110 of the distribution system 100.

The protection method comprises a first step E300 of receiving a request M1 coming from the client 170 for obtaining a digital image 203, the reference 203 of this image being included in said request M1.

Preferably, this request M1 is received using the HTTP protocol.

In a first embodiment, the reference 203 of the digital document 203 is included in a URL of the type http://www-.centralserver.com/203, in which in a known manner:
  the first part "http" describes the protocol to be used on the network;
  the second part "www.centralserver.com" is the address of the central server, and
  the third part, "203", is the unique reference of the digital document 203.

In a variant, the reference 203 can be a structured name associated logically with a digital document, for example in the form author/collection/title.

In a variant the reference 203 can be passed as a parameter of an http request of the POST type.

In another variant, the reference 203 can contain information on the type of digital document (for example image of the JPEG or JPEG2000 type), or on attributes of this document (size, resolution, etc).

The step E300 of receiving the request M1 is followed by a step E310 of authenticating an identifier U of a user of the client 170.

A preferred authentication method used at this step E310 consists of establishing a secure connection of the HTTPS type with the client 170 and then requesting of this user, in a known fashion, an identifier and a password.

This method can also be improved by using, in a known fashion, a cookie saved by the client 170 and transmitted with the request M1 described previously.

The authentication step E310 is followed by a step E320 of generating an access key K(170) for identifying the client 170 and preferably the user U of this client 170.

This key K(170) can be created using an encrypting technique known to persons skilled in the art, such as the one described in the document U.S. Pat. No. 6,263,432.

The key K(170) can be obtained, in the embodiment described here, by concatenation:
- of a string of characters consisting of the address IP_170 of the client 170, the time, and preferably the identifier U of the user obtained during the authentication step E310 described previously; and
- a signature calculated by hashing the aforementioned string using for example the MD5 algorithm and then an asymmetric encrypting algorithm such as RSA using the private key of the server.

Step E320 of generating the key K(170) is followed by a step E330 of selecting a peer system of the network 110 likely to contain the digital document 203 whose reference 203 was received in the request M1.

In practice this step E330 of selecting a peer system is performed by searching in the database 180 of the server 110 an active peer system containing the document 203.

It is assumed hereinafter that the central server 110 selects the peer system 131 during this step.

The step E330 of selecting the peer system 131 is followed by a step E340 of creating a message M2 containing the reference 203 of the digital document 203, the address IP_131 of the selected peer system 131 and the access key K(170).

In the preferred embodiment described here, the message M2 is created in the form of a page adapted to be displayed by the Internet browser 171 of the client 170.

In the remainder of this document, the term "window" will be used to designate an area of the screen of the browser 170 able to display data coming from a server other than the one which supplied the main page; such an area may for example be defined by the HTML instruction <frame> or by the HTML instruction <img>.

Figure 4:
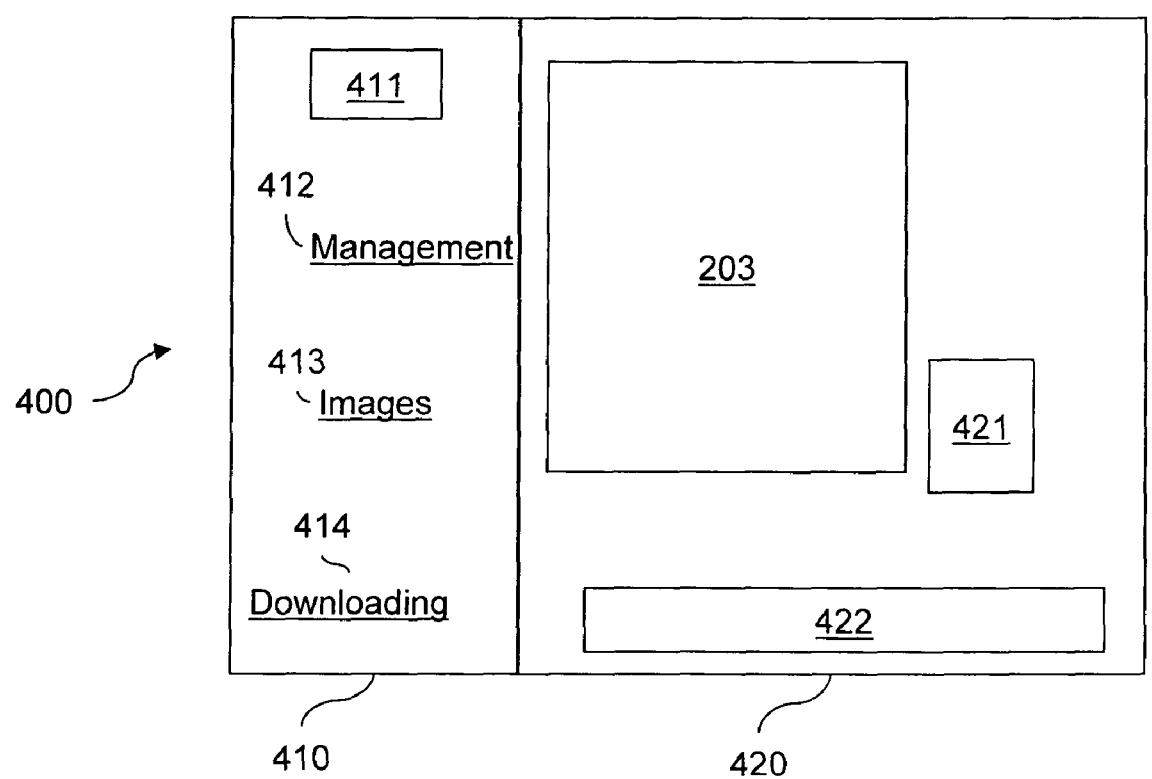
FIG. 4 depicts a page intended to be displayed by an Internet browser, in accordance with the present invention in a preferred embodiment.

An example 400 of such a page will now be described with reference to FIG. 4.

This page 400 comprises a first window 410 which remains managed by the central server 110. This first window 410 can contain:
- advertising information 411;
- at least one link 412 to data relating to the management of the user U by the central server 110;
- a link 414 allowing the downloading of a computer program implementing the distribution method according to the invention; and
- at least one link 413 whose activation makes it possible to send a request to the central server 110 for obtaining the address IP_132 of a second peer server 132 likely to contain the digital document 203.

The activation of this link 413 thus advantageously makes it possible to obtain the document 203 when the first peer system 131 is unavailable.

The page 400 also contains at least one second window 420 intended to be managed subsequently by the first peer system 131 or by the second peer system 132.

The content of this second window 420 is modified in order to display the digital images 421, 422, 203 selected by the user U by means of the links 413 of the window 410.

The second window 420 also allows the display of a digital image received directly from a peer system 131, 132.

To this end, the page 420 contains for example the instruction:
<IMG src="http://IP131/K/203">.

In another embodiment described here, the message M2 is an HTTP response of the "forward" type to the obtaining request M1 described previously, such a response making it possible, in a known manner, to give a replacement URL to which the Internet browser 171 of the client 170 must connect.

In the present case this replacement URL is constructed from the address IP_131 of the peer system 131 selected during the selection step E330 and from the reference 203 of the image requested by the client 170.

In a known manner, the message M2 is of the form:
"HTTP/1.1 302 See another URI Location: http://IP131/K/203",
where:
- "HTTP1.1" indicates the type of protocol;
- "302" is a special error value indicating that the resource is temporarily unavailable on the server;
- "See another URI" is a comment;
- "Location" is the second key word indicating to the Internet browser that it should redirect itself to another URI;
- "IP131" is the address of the peer system 131 to be contacted;
- "K" is the key generated; and
- "203" the resource sought.

Returning to FIG. 3, the step E340 of creating the message M2 is followed by a step E350 of sending this message.

Thus, on reception of the message M2, the client 170 connects itself to the address of the peer system 131.

The distribution method used by this peer system 131 will now be described with reference to FIG. 5.

Figure 5:
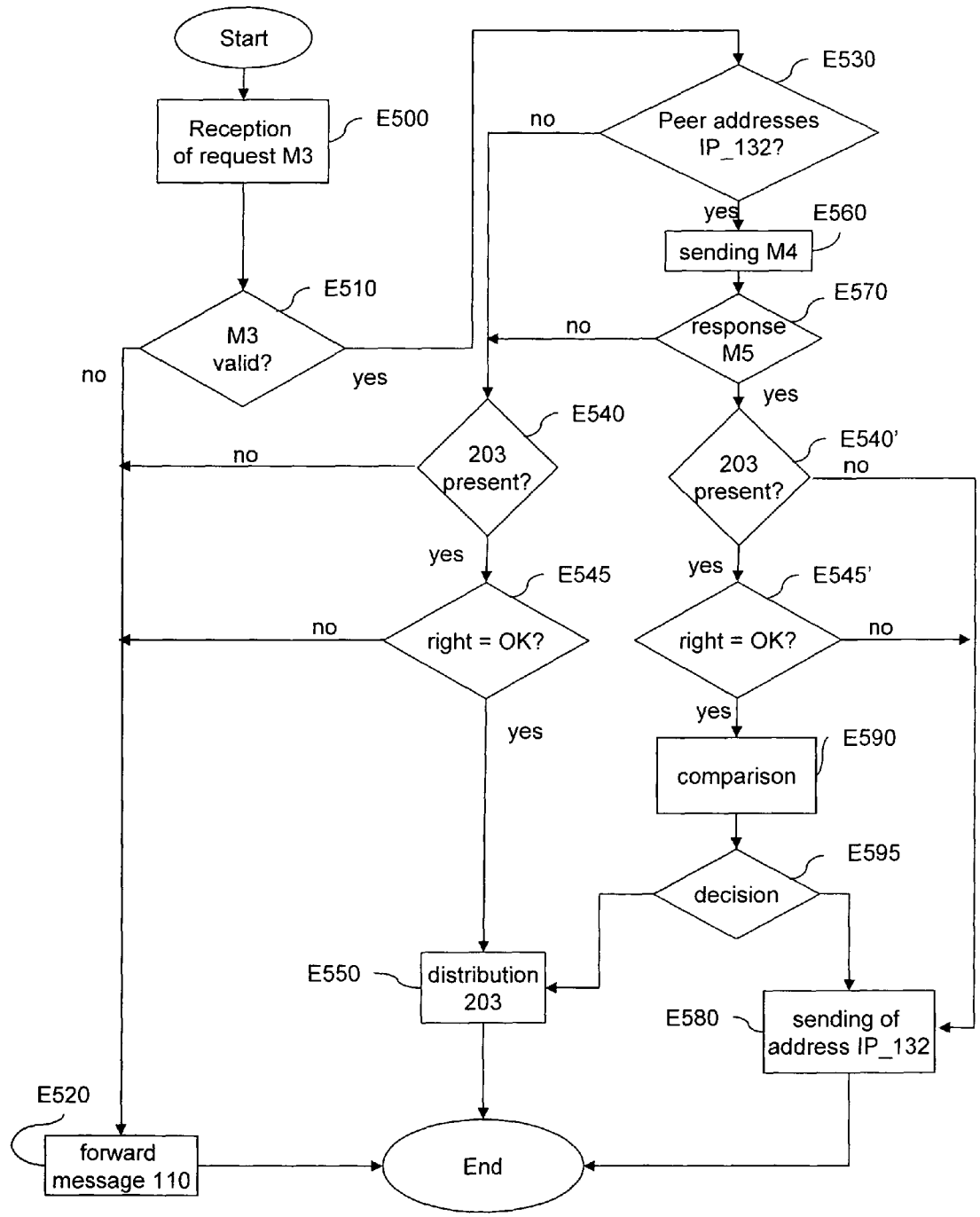
FIG. 5 depicts the principal steps of a distribution method according to the invention in a preferred embodiment.

FIG. 5 depicts the main steps E500 to E595 of a distribution method according to the invention in a preferred embodiment.

This distribution method can be set up in a peer system 131, 132, 133 of the distribution system 100.

The distribution method comprises a first step E500 of receiving a request M3 from the client 170 for obtaining the digital image 203 for that client.

The request M3 comprises the access key K(170) described above with reference to FIG. 3.

This message M3 is of the form "GET http://IP131/K/203 HTTP/1.1".

During this same step E500 of receiving the request M3, coming from the client 170, the address IP_170 of the client 170 is obtained from the request M3. This obtaining takes place, in a conventional manner, by analyzing the TCP/IP connection.

The step E500 of receiving the request M3 is followed by an access control step E510 for verifying, using the access key K(170) received at the previous step, the validity of the message M3.

More precisely, the access control step E510 comprises a decrypting substep using a public key of the central server 110 which generated the key K(170) as described previously.

This decrypting substep is adapted to obtain, using the access key K(170), the time, a second address IP_170' contained in the key K(170), and the identifier of the user U as described previously with reference to step E320 of FIG. 3.

In the preferred embodiment described here, during the access control step E510, the message is validated when:
- firstly the time elapsed since the time obtained during the decrypting substep is less than a predetermined time; and
- secondly the address IP_170' obtained during this same decrypting substep is identical to the address IP_170 of the client 170 obtained during the step E500 of receiving the request M3.

The message M3 is refused when at least one of these two conditions is not satisfied.

Thus, by comparing the two addresses, it is ensured that the request M3 has been sent by the client 170 for which the access key K(170) was generated by the central server 110.

It is also ensured, by verifying the aforementioned time elapsed, that the access key K(170) was generated within a reasonable time.

In the example of distributing digital images 203 described here, the aforementioned time can advantageously be chosen to be around twenty minutes.

In the preferred embodiment described here, when access is not authorized, the access control step E510 is followed by a redirection step E520 during which the peer system 130 sends a message to the client 170 in order to redirect the latter to the central server 110.

This message can be a message of the forward type as described previously, forcing the client 170 to recontact the central server 110.

Preferably, this message contains the address IP_130 of the peer server 130, the disputed access key K(170), and the reference 203 of the digital image requested.

On the other hand, when the message M3 is validated, the access control test E510 is followed by a test E530 during which the address IP_132 of at least one second peer system 132 of the distribution network 100 is sought in a memory of the peer system 131.

In the embodiment described here, this address is chosen from a list containing the addresses of the peer systems which have been connected, since a predetermined time, with the peer system 131.

If the peer system 131 knows no other peer system likely to contain the document 203, the result of test E530 is negative.

This test is then followed by a test E540 during which it is sought whether at least part of the digital image 203 in a memory accessible to the peer system 131 implementing the distribution method described here. This search step consists of seeking the digital document 203 on the local server 150 of the peer system 131.

The part of the digital image 203 can for example correspond to a low-resolution version of this image stored on the local server 150.

If the digital document 203 is not present in the memory of the peer system 131, not even partly, the result of the test E540 of the search is negative.

This test is then followed by the redirection step E520 already described.

On the other hand, if at least part of the digital document 203 is present in the memory of the peer system 131, the result of the search test E540 is positive.

This search test E540 is then followed by an authentication test E545 during which it is verified whether the user U is authorized to access the document 203 from the peer server 131.

In a variant, these access rights can be stored on the peer server 131 itself.

If the user U is not authorized to access the digital document 203 from the peer server 131, the result of the authentication test E545 is negative.

This test is then followed by the redirection step E520 already described.

On the other hand, if the user U is authorized to access the digital document 203 from the peer server 131, the result of the authentication test E545 is positive.

This authentication test E545 is then followed by a step E550 of distributing the part of the digital image 203 to the client 170.

Returning to the obtaining test E530, if the peer system 131 knows at least one second peer system 133, the result of the test E530 of obtaining the address of at least one second peer system is positive. This test is then followed by a step E560 of sending an invitation message M4 containing the reference 203 of this document to the second peer system 133.

Preferably, this invitation message M4 comprises the identifier U of the user obtained during the access control step E510 by decrypting the access key K(170).

Whatever the case, this invitation message M4 also contains the address IP_131 of the peer server 131.

It should be noted however that the invitation message M4 is different from the request M3 received from the client 170 at the step E500 of receiving a request, since the expected response to this invitation message consists of an acceptance or refusal to serve the digital document 203 rather than of the document itself.

The step E560 of sending the invitation message M4 is followed by a test E570 during which at least one confirmation message M5 coming from the second peer system 133 or from another second peer system 132 to which the invitation message M4 was propagated is awaited.

The confirmation message M5 is received if the document 203 is available in a memory accessible to the second peer system originating this confirmation message M5.

This confirmation message M5 contains at least one attribute of the second peer system 132, 133, including the load of this second peer system, its communication capacity, the number of digital documents stored by this second peer system, and the number of documents and document parts distributed by this second peer system.

This message M5 preferably indicates the number of documents and document parts available for the user U on this second peer system 132, 133.

Preferably, this confirmation message M5 is received only if the user of the client 170 is also authorized to access the document 203 from the second peer system 132.

If no confirmation message M5 is received for a predetermined period, the result of the test E570 of receiving a confirmation message is negative.

This test is then followed by the search test E540 already described.

On the other hand, if a confirmation message M5 is received during this predetermined time, the result of the test E570 of receiving a confirmation message M5 is positive.

This test is then followed by a second search test E540' similar to the search test E540 already described.

If the digital document 203 is not present in the memory of the peer system 131, if only in part, the result of the second search test E540' is negative.

This test is then followed by a step E580 of sending a message M6 containing the address IP_132 of the second peer system 132 to the client 170, this address having been obtained during the test E570 of receiving the confirmation message M5 already described.

On the other hand, if the digital document 203 is present in the memory of the peer system 131, at least in part, the result of the second search test E540' is positive.

This second search test E540' is then followed by a second authentication test E545' similar to the authentication test E545 already described.

If the user U is not authorized to access the digital document 203 from the peer server 131, the result of the second authentication test E545' is negative.

This test is then followed by the already described step E580 of sending a message M6 containing the address IP_132 of the second peer system 132 to the client 170.

On the other hand, if the user U is authorized to access the digital document 203 from the peer server 131, the result of the second authentication test E545' is positive.

This second authentication test E545' is then followed by a comparison step E590 during which at least one attribute of the peer system 131 is compared with at least one corresponding attribute of the second peer system 132.

This comparison step E590 makes it possible to decide whether the digital document 203 is to be distributed to the client by the peer system 131 or whether it suffices for the peer system 131 to send the client the address IP_132 of the second peer system 132.

In practice the comparison step E590 compares one or more attributes, including the load, the communication capacities of the peer systems 131 and 132, the number of digital documents stored, and the number of documents or document parts distributed by these systems.

It should be stated that the attributes of the second peer system 132 were received by the peer system 131 for this purpose during the step E570 of receiving the confirmation message M5.

The comparison step E590 is followed by a decision step E595 during which it is decided whether the distribution of the digital document 203 to the client 170 must be performed by the peer server 131 or by the second peer server 132.

In practice, it may be decided, for example, that the digital document 203 be distributed by the peer system possessing maximum communication capacities, or a minimum load, or by the one which has distributed the fewest documents.

If during the decision step it is decided that the document 203 is to be distributed by the peer system 131, the decision test E595 is followed by the step E550 of distributing the digital document 203 already described.

In the case where only part of the document 203 is accessible to the peer system 131, the response sent by this system 131 can also comprise a link to another server in order to access another part of this document 203.

On the other hand, if it is decided that the digital document 203 is to be distributed by a second peer system 132, the decision step E595 is followed by the step E580 already described of sending a message M6 containing the address IP_132 of the second peer system 132 to the client 170.

The steps E520 of redirection, E550 of distribution of the digital document 203 and E580 of sending the address of the second peer system 132 end the distribution method in the embodiment.

Figure 6:
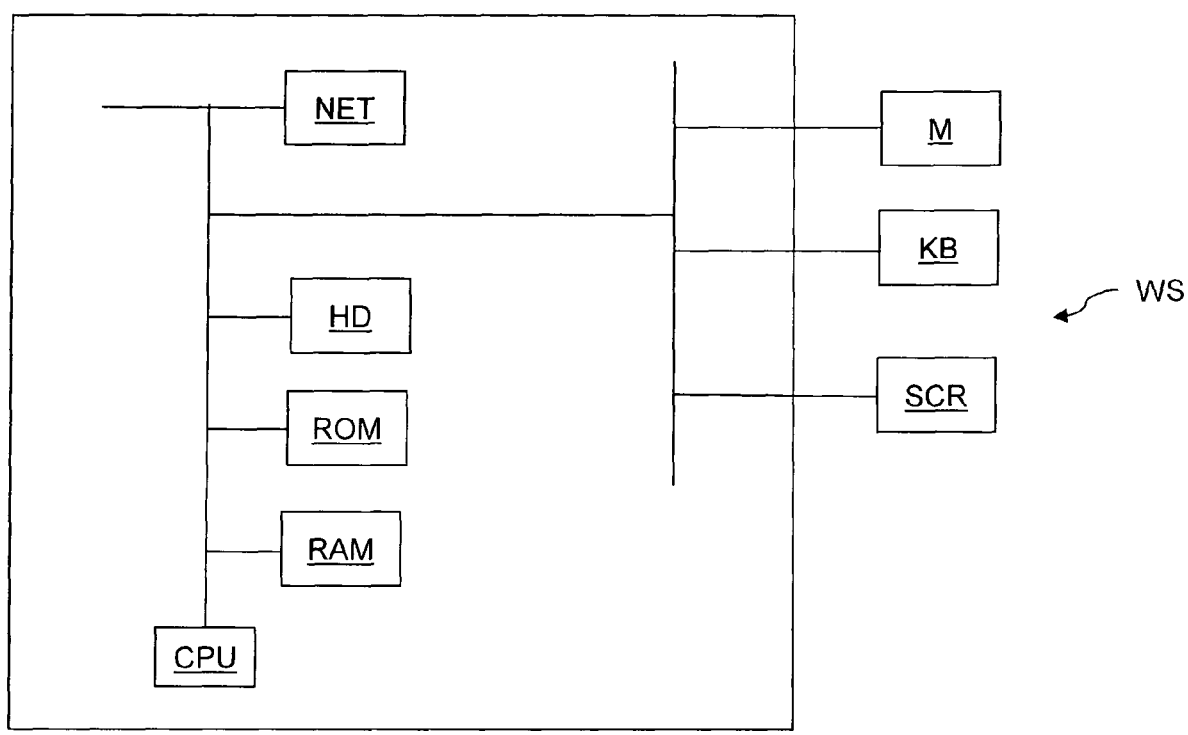
FIG. 6 depicts schematically a computer which can be used for implementing the central server and a peer system according to the present invention, in a preferred embodiment.

In the embodiment described here, the central server 110 and the peer system 131 are computers, of the same type as the computer WS depicted in FIG. 6.

The hardware architecture of the computer WS is known to persons skilled in the art.

This hardware architecture comprises in particular a processor CPU, a read only memory ROM, a random access memory RAM, a hard disk HD, a network card NET for communication with the Internet, a keyboard KB, a screen SCR, and a mouse M, these various elements being, in a known fashion, adapted to communicate through a bus system.

The computer WS also comprises drivers for controlling the aforementioned hardware elements and an operating system OS.

In the embodiment of the distribution system described here, the server 110 also comprises a database 180 containing:

the state of the peer to peer network, namely a list of the addresses of the peer systems of the distribution system active at a given time;

the capacities of these peer systems in terms of processor and memory size;

the communication capacities of these peer systems (type of network connection, speed of modem, etc);

the list of the references 203 of the digital documents and/or of the collections 202 which the peer systems wish to share on the network.

The hard disk HD of the central server 110 contains instructions of a computer program SECU for implementing a protection method as described above with reference to FIG. 3.

The computer program SECU comprises amongst other things the following software modules:

a communication module SW_COMM adapted to receive, using the HTTP protocol, a request M1 coming from a client 170 on the Internet and extracting from this request M1 the identifier 203 of a digital document. The communication module SW_COMM is also adapted to obtain the address IP_170 of the client 170 from the request M1 by analysis of the TCP/IP connection;

a module SW_AUTH adapted to authenticate an identifier U of a user of the client 170;

a module SW_CRYP adapted to generate the access key K(170), by an encrypting method using a private key of the central server, the time, the address IP_170 of the client 170 and the identifier U;

a module SW_SEL for selecting a peer system 131 likely to contain the digital document 203, this selection being made using the database 180;

In a first embodiment, the communication module SW_COMM is adapted to construct a message M2 in the form of an http response of the "forward" type, this message M2 containing the reference 203, the address IP_131 of the peer system 131, and the access key K(170), and to send this message M2 to the client 170.

In a second embodiment, the communication module SW_COMM is adapted to send the message M2 in the form of a page comprising:

a first window 410 managed by the central server 110, the first window comprising a link 413 whose activation generates the sending of a request to the central server 110 in order to obtain the address of a second peer system 132 likely to contain the digital document 203; and at least one second window 420 intended to be managed by the peer system 131 or the second peer system 132.

The hard disk HD of the peer system 131 contains instructions of a computer program DISTRIB for implementing a distribution method as described previously with reference to FIG. 5.

The computer program DISTRIB contains amongst other things the following software modules:

a communication module SW_COMM adapted to receive, using the HTTP protocol, a request M3 coming from a client 170 on the Internet and extracting from this request M3 the identifier 203 of a digital document and an access key K(170);

a module SW_OBT for obtaining an address IP_132, IP_133 of a second peer system 132, 133 likely to include the document 203. In the embodiment described here, this address is chosen from a list containing the addresses of the peer systems which have been connected, for a predetermined time, with the peer system 131;

a control module SW_CTRL adapted, using the access key K(170), to validate or refuse the request M3;

a module SW_SEARCH for seeking at least part of the document 203 in a memory accessible to the peer system 131;

a module SW_DISTRIB for distributing at least part of the document 203 to the client 170 if the request M3 is validated;

a module SW_ROUTE for comparing an attribute of the peer system 131 with a corresponding attribute of a second peer system 132, 133, this attribute representing the load or communication capacities of the systems, the number of digital documents stored, the number of documents or document parts distributed by the systems, or the number of documents available for a user on these systems.

The comparison module SW_ROUTE is also adapted to use the distribution module SW_DISTRIB or the communication module SW_COMM according to the result of this comparison.

The communication module SW_COMM is also adapted to obtain the address IP_170 of the client 170 from the request M3 by analyzing the TCP/IP connection and to send the address IP_132, IP_133 of the second peer system 132, 133 to the client 170.

In the preferred embodiment described here, the control module SW_CTRL uses decrypting means using a public key of a central server 110 of the network, these decrypting means being adapted to obtain a time and a second address using the access key K(170).

In this embodiment, the control module SW_CTRL is adapted to:

a) validate the request (M3) when the time elapsed since the last time is less than a predetermined time and the said second address is identical to the said address (IP_170) of the client (170); and b) refuse the request (M3) otherwise.

Preferably, the decrypting means also obtain an identifier U of a user of the client (170) using the access key K(170) and the access control module SW_CTRL validates or refuses the request M3 after having verified the rights of access to the document 203 by this user from the identifier U.

In the preferred embodiment described here, the obtaining module SW_OBT is adapted to send an invitation message M4 containing the reference 203 of the document to the second peer system 132 and to receive a confirmation message M5 coming from this second peer system 132 when the document 203 is available in a memory accessible to this second peer system 132.

In a preferred embodiment, the confirmation message M5 signifies the fact that the user is authorized to access the document 203 from the second peer system 132.

In this preferred embodiment, the obtaining module SW_OBT sends the identifier U of the user in the invitation message M4.

The invention claimed is:

1. A central server in a network of a hybrid peer to peer type, comprising:
   a memory and a processor;
   receiving means for receiving a request from a non-peer client for obtaining a digital document by that non-peer client, said request containing a reference of said digital document, wherein the non-peer client does not constitute a peer of the network;
   selecting means for selecting a peer system of the network likely to contain said digital document, by searching in a database of said central server for an active peer system containing said digital document;
   generating means for generating an access key for controlling access to the digital document by said non-peer client, said generating means generating said access key by an encrypting method using a private key of said central server to encrypt a character string containing a current time when said encrypting method is executed and an address of said non-peer client on the network;
   sending means for sending a message to the non-peer client, comprising the reference of the digital document, an address of the selected peer system on the network and the generated access key, wherein said message contains information allowing said non-peer client to connect to the selected peer system via an Internet web browser; and
   authenticating means for authenticating an identifier of a user of said non-peer client,
   wherein said character string further comprises said identifier of said user of the non-peer client, and
   wherein said access key is designed to enable validation by said selected peer system of the network of an access request to said digital document by the user of the non-peer client on said selected peer system.

2. The central server according to claim 1, wherein the sending means sends said message in the form of a page containing:
   a first window managed by said central server, said first window comprising a link whose activation generates the sending of a request to said central server in order to obtain an address of a second peer system likely to contain said digital document; and
   at least one second window intended to be managed by said selected peer system or said second peer system.

3. The central server according to claim 1, wherein the sending means sends said message in the form of a Hyper Text Transfer Protocol (HTTP) response of the forward type.

4. A method of protecting the distribution of a digital document, the protection method being implemented in a central server of a network of a hybrid peer to peer type and comprising:
   a receiving step of receiving a request from a non-peer client for obtaining a digital document by that non-peer client, said request comprising a reference of said digital document, wherein the non-peer client does not constitute a peer of the network;
   a selecting step of selecting a peer system of said network likely to contain said digital document, by searching in a database of said central server for an active peer system containing said digital document;
   a generating step of generating an access key for controlling access to the digital document by the non-peer client, said generating step comprising generating the access key by an encrypting method using a private key of said central server to encrypt a character string containing a current time when said encrypting method is executed and an address of said non-peer client on the network;
   a sending step of sending a message to said non-peer client, comprising said reference of said digital document, an address of said selected peer system on said network and said generated access key, wherein said message contains information allowing said non-peer client to connect to the selected peer system via an Internet browser; and
   authenticating an identifier of a user of said non-peer client,
   wherein said character string further comprises said identifier of said user of the non-peer client, and
   wherein said access key is designed to enable validation by said selected peer system of the network of an access request to said digital document by the user of the non-peer client on said selected peer system.

5. The protection method according to claim 4, wherein, during said sending step, said message is sent in the form of a page containing:
   a first window managed by said central server, said first window comprising a link whose activation generates the sending of a request to said central server in order to obtain an address of a second peer system likely to contain said digital document; and at least one second window intended to be managed by said selected peer system or said second peer system.

6. The protection method according to claim 4, wherein, during said sending step, said message is sent in the form of a Hyper Text Transfer Protocol (HTTP) response of the forward type.

7. A digital document distribution peer device in a network of a hybrid peer to peer type, comprising:

receiving means for receiving a request from a client for obtaining a digital document for that client, the request containing a reference of said document;

obtaining means for obtaining an address of at least one second peer device in the network likely to contain said digital document;

comparison means for comparing at least one attribute of said peer device with at least one corresponding attribute of said at least one second peer device, wherein said attribute and said corresponding attribute is a characteristic of a peer device representative of a load or of a communication capacity of said peer device to serve documents;

deciding means for deciding, based on a result of the comparison by said comparison means, whether said peer device is to serve the document or whether the address of the second peer device is to be sent to the client;

serving means for serving the document to the client in a case where the deciding means decides that the peer device is to serve the document;

sending means for sending said address of said at least one second peer device to said client in a case where the deciding means decides that the address of the second peer device is to be sent to the client;

access control means for using an access key included in said request for controlling access to the digital document by said client, in order to validate or refuse the request;

validation means for validating or refusing the request; and redirecting means for forwarding a message to said client to redirect said client to a central server of the network, in the case where the request is refused.

8. The peer device according to claim 7, further comprising distributing means for distributing to said client at least part of said digital document in a memory accessible to said peer device.

9. The peer device according to claim 7, wherein the access control means comprises decrypting means using a public key of a central server in said network, said decrypting means for obtaining, from the access key, a time when the access key was generated; and said access control means further for
a) validating the request when the time elapsed since said time when the access key was generated is less than a predetermined time; and
b) refusing the request otherwise.

10. The peer device according to claim 9, wherein
said receiving means obtains an address of said client from the request;
said decrypting means obtains a second address using the access key; and
said access control means further
a) validates the request when said second address is identical to said address of said client; and
b) refuses the request otherwise.

11. The peer device according to claim 9, wherein
said decrypting means obtains an identifier of a user of the client using the access key; and said access control means validates or refuses the request after having verified access rights to said digital document by said user from said identifier.

12. The peer device according to claim 11, wherein said obtaining means sends an invitation message containing the reference of said document to at least one second peer device and receives a confirmation message from at least one second peer device when said digital document is available in a memory accessible to said peer device and wherein said confirmation message signifies the fact that said user is authorized to access said digital document from said at least one second peer device originating said confirmation message.

13. The peer device according to claim 12, wherein said obtaining means sends said identifier of the user in said invitation message.

14. The peer device according to claim 11, wherein said at least one attribute of the peer device and said at least one attribute of the second peer device represent a number of documents available for said user on each respective peer device.

15. The peer device according to claim 7, wherein said obtaining means sends an invitation message containing the reference of said document to at least one second peer device and receives a confirmation message from at least one second peer device when said digital document is available in a memory accessible to said peer device.

16. The peer device according to claim 7, wherein said at least one attribute of the peer device and said at least one attribute of the second peer device represent a number of digital documents stored by each respective peer device, or a number of documents or document parts distributed by each respective peer device.

17. A method of distributing a digital document implemented in a peer device of a hybrid peer to peer type network, comprising a receiving step of receiving a request, from a client, for obtaining a digital document for said client, the request containing a reference of said digital document;

an obtaining step of obtaining an address of at least one second peer device likely to contain said digital document;

a comparison step of comparing at least one attribute of said peer device with at least one corresponding attribute of said at least one second peer device, wherein said attribute and said corresponding attribute is a characteristic of a peer device representative of a load or of a communication capacity of said peer device to serve documents;

a deciding step of deciding, based on a result of the comparison by said comparison step, whether said peer device is to serve the document or whether the address of the second peer device is to be sent to the client;

a serving step of serving the document to the client in a case where the deciding step decides that the peer device is to serve the document;

a sending step of sending said address of said at least one second peer device to said client in a case where the deciding step decides that the address of the second peer device is to be sent to the client;

an access control step for using an access key included in said request for controlling access to the digital document by said client, in order to validate or refuse the request;

a validation step for validating or refusing the request; and a redirecting step for forwarding a message to said client to redirect said client to a central server of the network, in the case where the request is refused.

18. The distribution method according to claim 17, further comprising a distributing step of distributing to said client at least part of said digital document in a memory accessible to said peer device.

19. The distribution method according to claim 17, wherein said access control step comprises,
a decrypting sub step using a public key of a central server of said network, said
decrypting sub step obtaining from the access key a time when said access key was generated; and
said access control step:
a) validates the request for access to the digital document by said client when the time elapsed since said time when the access key was generated is less than a predetermined time; and
b) said request is refused otherwise.

20. The distribution method according to claim 19, wherein
in said step of receiving the request, an address of said client is obtained from the request;
said decrypting sub step obtains a second address from the access key; and said access control step:
a) validates the requested access to the digital document when said second address is identical to said address of the client; and
b) said request is refused otherwise.

21. The distribution method according to claim 19, wherein
said decrypting substep obtains an identifier of a user of the client using the access key; and the method further comprises:
an authentication step during which access rights for access to the digital document by said user are verified from said identifier;
wherein said access control step validates the request or refuses the request according to said access rights.

22. The distribution method according to claim 21, wherein said identifier of the user is sent in an invitation message.

23. The distribution method according to claim 22, wherein a confirmation message is received coming from said at least one second peer device if said user is authorized to access said digital document from said peer device.

24. The distribution method according to claim 17, wherein, during said step of obtaining the address of at least one second peer device:
an invitation message containing the reference of said digital document is sent to said at least one second peer device; and
a confirmation message is received coming from at least one second peer device when said digital document is available in a memory accessible to said peer device.

25. The distribution method according to claim 17, wherein said at least one attribute of the peer device and said at least one attribute of the second peer device represent a number of digital documents stored in each respective peer device, or a number of documents or document parts distributed by each respective peer device.

26. A non-transitory computer-readable storage medium, which can be read by a computer and on which is stored a computer-executable program for implementing a method of protecting the distribution of a digital document, the protection method being implemented in a central server of a network of a hybrid peer to peer type and comprising:
a receiving step of receiving a request from a non-peer client for obtaining a digital document by that non-peer client, said request comprising a reference of said digital document, wherein the non-peer client does not constitute a peer of the network;
a selecting step of selecting a peer device of said network likely to contain said digital document, by searching in a database of said central server for an active peer device containing said digital document;
a generating step of generating an access key for controlling access to the digital document by the non-peer client, said generating step comprising generating the access key by an encrypting method using a private key of said central server to encrypt a character string containing a current time when said encrypting method is executed and an address of said non peer client on the network;
a sending step of sending a message to said non-peer client, comprising said reference of said digital document, an address of said selected peer device on said network and said generated access key, wherein said message contains information allowing said non-peer client to connect to the selected peer device via an Internet browser; and
authenticating an identifier of a user of said non-peer client, wherein said character string further comprises said identifier of said user of the non-peer client, and
wherein said access key is designed to enable validation by said selected peer system of the network of an access request to said digital document by the user of the non-peer client on said selected peer system.

27. A non-transitory computer-readable storage medium, which can be read by a computer and on which is stored a computer-executable program for implementing a method of distributing a digital document in a peer device of a hybrid peer to peer type network, comprising
a receiving step of receiving a request, from a client, for obtaining a digital document for said client, the request containing a reference of said digital document;
an obtaining step of obtaining an address of at least one second peer device likely to contain said digital document;
a comparison step of comparing at least one attribute of said peer device with at least one corresponding attribute of said at least one second peer device, wherein said attribute and said corresponding attribute is a characteristic of a peer device representative of a load or of a communication capacity of said peer device to serve documents;
a deciding step of deciding, based on a result of the comparison by said comparison step, whether said peer device is to serve the document or whether the address of the second peer device is to be sent to the client;
a serving step of serving the document to the client in a case where the deciding step decides that the peer device is to serve the document;
a sending step of sending said address of said at least one second peer device to said client in a case where the deciding means decides that the address of the second peer device is to be sent to the client;
an access control step for using an access key included in said request for controlling access to the digital document by said client, in order to validate or refuse the request;
a validation step for validating or refusing the request; and
a redirecting step for forwarding a message to said client to redirect said client to a central server of the network, in the case where the request is refused.

* * * * *